(12) United States Patent
Vartiainen et al.

(10) Patent No.: US 11,214,046 B2
(45) Date of Patent: Jan. 4, 2022

(54) BIO-BASED MINERAL OIL BARRIER COATINGS AND FILMS

(71) Applicant: Teknologian tutkimuskeskus VTT Oy, Espoo (FI)

(72) Inventors: Jari Vartiainen, Espoo (FI); Christiane Laine, Espoo (FI); Marja Pitkänen, Espoo (FI); Taina Ohra-Aho, Espoo (FI); Adina Anghelescu-Hakala, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 40 days.

(21) Appl. No.: 16/063,300

(22) PCT Filed: Feb. 3, 2017

(86) PCT No.: PCT/FI2017/050058
§ 371 (c)(1),
(2) Date: Jun. 18, 2018

(87) PCT Pub. No.: WO2017/134345
PCT Pub. Date: Aug. 10, 2017

(65) Prior Publication Data
US 2019/0001647 A1  Jan. 3, 2019

(30) Foreign Application Priority Data
Feb. 3, 2016  (FI) ........................ 20165075

(51) Int. Cl.
*B32B 27/32* (2006.01)
*B32B 23/08* (2006.01)
(Continued)

(52) U.S. Cl.
CPC .............. *B32B 27/32* (2013.01); *B32B 23/08* (2013.01); *B32B 27/10* (2013.01); *B32B 27/12* (2013.01);
(Continued)

(58) Field of Classification Search
CPC .................................. B32B 27/10; C08L 1/02
See application file for complete search history.

(56) References Cited

U.S. PATENT DOCUMENTS 4,096,325 A  6/1978  Teng et al.
2006/0286367 A1  12/2006  Fish
(Continued)

FOREIGN PATENT DOCUMENTS

EP  2290000 A1 *  3/2011  ............ C09J 167/08
EP  2734362 B1  9/2015
(Continued)

OTHER PUBLICATIONS

Fukuzumi—cellulose nanofibers—TEMPO-mediated oxidation—Biomacromolecules—20 um—2009 (Year: 2009).*
(Continued)

*Primary Examiner* — Callie E Shosho
*Assistant Examiner* — John Vincent Lawler
(74) *Attorney, Agent, or Firm* — Laine IP Oy; Mark W. Scott (57) ABSTRACT

According to an example aspect of the present invention, there is provided bio-based mineral oil barrier coatings and films usable for decreasing mineral oil migration, for example in food packaging materials, and thus improving the safety of the materials facing the mineral oil containing environment.

16 Claims, 3 Drawing Sheets

(51) Int. Cl.
| | |
|---|---|
| B32B 27/10 | (2006.01) |
| C08J 7/04 | (2020.01) |
| C08J 7/043 | (2020.01) |
| C08J 7/048 | (2020.01) |
| C08J 7/052 | (2020.01) |
| B32B 27/12 | (2006.01) |
| C08L 1/02 | (2006.01) |
| C08L 23/06 | (2006.01) |

(52) U.S. Cl.
CPC .............. *C08J 7/043* (2020.01); *C08J 7/048* (2020.01); *C08J 7/0427* (2020.01); *C08J 7/052* (2020.01); *C08L 1/02* (2013.01); *C08L 23/06* (2013.01); *B32B 2439/70* (2013.01); *B32B 2439/80* (2013.01); *B32B 2553/00* (2013.01); *C08J 2301/02* (2013.01); *C08L 2207/062* (2013.01); *Y02W 90/10* (2015.05)

(56) References Cited

U.S. PATENT DOCUMENTS

| | | | | |
|---|---|---|---|---|
| 2007/0184220 | A1* | 8/2007 | Cleveland | B32B 27/20 428/34.2 |
| 2012/0094047 | A1* | 4/2012 | Albertson | C08L 97/02 428/36.6 |
| 2012/0207887 | A1* | 8/2012 | Battersby | C09D 193/02 426/127 |
| 2012/0308749 | A1 | 12/2012 | Seyffer et al. | |
| 2014/0288296 | A1* | 9/2014 | Qi | C08J 5/18 536/56 |
| 2015/0158985 | A1 | 6/2015 | Fitch et al. | |
| 2016/0024326 | A1* | 1/2016 | Khan | C09D 129/04 428/500 |

FOREIGN PATENT DOCUMENTS

| | | | | |
|---|---|---|---|---|
| WO | WO2010141581 | A1 | 12/2010 | |
| WO | WO-2013010648 | A1* | 1/2013 | .......... H01R 13/512 |
| WO | WO2013010649 | A2 | 1/2013 | |
| WO | WO2013076241 | A3 | 7/2013 | |
| WO | WO2014006269 | A1 | 1/2014 | |
| WO | WO2014134110 | A1 | 9/2014 | |

OTHER PUBLICATIONS

Aulin—ISR D#7—oil barrier prop. microfibrillated cellulose coatings—2.5—5 um—2010 (Year: 2010).*
Skatar—WO2013-010649 A2—sister of ISR D#5—MT—coated paper—2013 (Year: 2013).*
Laine—hydroxyalkylated xylans—coatings for paper—IDS—Industr. Crops & Products—13-19 um—2013 (Year: 2013).*
BASF—ecovio_PS_1606 (Year: 2014).*
Braskem—AF_Catalogo_Bio-HDPE Verde_2014_site (Year: 2014).*
Kumar—ISR D#6—microfibrillated cellulose films—Cellulose—10-30 um—2014 (Year: 2014).*
Guazzotti—barrier properties of cellulose coatings on paperboard—Food Pack.—2015 (Year: 2015).*
Polymer Database—Poly(vinyl alcohol)—May 2020 (Year: 2020).*
Kim—corona bonding of polymers to cellulose—J.PolySci.Part C—1970 (Year: 1970).*
Chuberre—mineral oils in cosmetics—JEADV 2019 (Year: 2019).*
Yousefi—cellulose nanofiber board—carbo.poly.—density of nanofiber board—2018 (Year: 2018).*
Fukuzumi et al: Influence of TEMPO-oxidized cellulose nanofibril length on fihn properties. Carbohydrate Polymers, Applied Science Publishers, Ltd. Barking. vol. 93, No. 1, May 18, 2012, pp. 172-177.
Fukuzumi et al: Transparent and High Gas Barrier Films of Cellulose Nanofibers Prepared by TEMPO-Mediated Oxidation. Biomacromolecules, American Chemical Society. vol. 10, Dec. 4, 2008, pp. 162-165.
European Food Safety Authority: ESFA Panel on Contaminants in the Food Chain (CONTAM), Scientific Opinion on Mineral Oil Hydrocarbons in Food. EFSA Journal, vol. 10 No. 6, 2012, pp. 1-185.
Jansen, M.: Green PE: conventional performance from a sustainable source (According to Google date range has been available in Internet from Jul. 2012), p. 5.
Kumar, V. et al: Comparison of nano- and microfibrillated cellulose films. Cellulose, vol. 21, 2014, pp. 3443-3456.
O'Connor, G. et al: Mineral Oil Barrier Testing of Cellulose-Based and Polypropylene-Based Films, Packaging Technology & Science, vol. 28, 2015, pp. 75-89.
The Future of Global Packaging to 2018, Smithers Pira Market Report, http://www.smitherspira.com/products/market-reports/packaging/global-world-packaging-industry-market-repo.
Transparency Market Research: Breakfast Cereals Market to Reach US$43.2 Billion by 2019 Owing to Rising Need for Convenience Foods. http://www.transparencymarketresearch.com/pressrelease/breakfast-cerealsindustry.htm.
Aulin C. et al: Oxygen and oil barrier properties of microfibrillated cellulose films and coatings. Cellulose 2010, vol. 17, 2010, pp. 559-574.
Aulin, C. et al: Nanoscale Cellulose Films with Different Crystallinities and Mesostructures—Their Surface Properties and Interaction with Water. Langmuir 2009, vol. 25, No. 13, pp. 7675-7685.
Ewender, J. et al: Permeation of Mineral Oil Components from Cardboard Packaging Materials through Polymer Films, Packaging Technology and Science, vol. 26, 2013, pp. 423-434.
Fiselier, K. et al: Barriers against the Migration of Mineral Oil from Paperboard Food Packaging: Experimental Determination of Breakthrough Periods. Packaging Technology and Science, vol. 25, 2012, pp. 285-301.
Hayaka, F. et al: Transparent and High Gas Barrier Films of Cellulose Nanofibers Prepared by TEMPO-Mediated Oxidation, Biomacromolecules, vol. 10, 2009, pp. 162-165.
Laine, C. et al: Hydroxyalkylated xylans—Their synthesis and application in coatings for packaging and paper. Industrial Crops and Products. vol. 44, 2013, pp. 692-704.
Matissek, R.: Mineral oil transfers to food. Food-Lab International, 2014, pp. 6-12.
Michaels, A. et al: Flow of Gases Through Polyethylene, Journal of Polymer Science, vol. L, 1961, pp. 413-439.
Syverud, K. et al: Strength and barrier properties of MFC films, Cellulose, vol. 16, 2009, pp. 75-85.
Vartiainen, J. et al: Bio-based multilayer barrier films by extrusion, dispersion coating and atomic layer deposition. Journal of Applied Polymer Science, vol. 133, No. 2, Article No. 42260, 2015, pp. 1-6.
Vartiainen, J. et al: Biopolymer Films and Coatings in Packaging Applications: A Review of Recent Developments. Materials Sciences and Applications. Scientific Research An Academic Publisher, vol. 5, 2014, pp. 708-718.

* cited by examiner

BIO-BASED MINERAL OIL BARRIER COATINGS AND FILMS

FIELD

The present invention relates to novel bio-based mineral oil barrier coatings and films, which are able to significantly decrease the effect of mineral oil migration and usable for example as dry and semi-dry food packaging materials, which currently face the risk of mineral oil contamination.

BACKGROUND

According to the Future of Global Packaging to 2018 (Smithers Pira Market Report), the value of global packaging market is expected to reach $975 billion by 2018. Consumption of food and drinks packaging covers almost half of it. Plastic is the most widely used and the fastest growing packaging material, followed by paper & board. While food packaging is required to fulfil a number of different functions, its primary role is to prevent loss of food quality and to give protection against environmental contamination.

Bio economy utilizes biomass derived raw materials for high-volume applications. Replacing the oil-based packaging materials with bio-based films and containers might give not only a competitive advantage due to more sustainable and greener image, but also some improved technical properties. Special attention should be paid to barrier properties which are extremely important especially for bio-based food packaging materials. Moisture resistance with sustainable polymers is in many cases inadequate, thus excessive water vapour transmission through packaging decreases the quality of foods resulting in shorter shelf-lives, increased costs and eventually more waste. During the years, the barrier properties have been developed especially against oxygen and other gases, water vapour, flavours, grease and UV-light (Vartiainen et al., 2014).

Recently, also mineral oil residues have been found in food. In some cases the origin of them was traced to paper & board packages made of recovered fibres (EFSA Journal, 2012). However, the contamination may be caused not only by the use of recycled paperboard as packaging material but also by additives, processing aids, and lubricants used in manufacturing the food packages. Mineral oil residues in foodstuffs have been linked to inflammation of internal organs and even cancer (Matissek, 2014) and therefore, new approaches are needed to prevent mineral oil migration from the packaging materials to foods. An ordinance setting limits to migration of mineral oil compounds in food and their content in food contact materials is in preparation in Germany and if it comes into force, the majority of packages made of recycled fibers will need a barrier against mineral oil compounds. The proposed limits for packaging material are significantly lower than average concentrations in recycled fiber. Currently, fossil-based HDPE film is used as a major raw material for inner pouches in cereals etc. dry food packaging. However, HDPE is very poor barrier against migration of mineral oil components (Fiselier and Grob, 2012; Ewender et al., 2013).

Some relating prior art exists. US 2006/0286367 for example relates to packaging materials for food pouch, including a barrier material on one side of substrate, and comprising blend of nanoparticle calcium carbonate and water soluble oxygen barrier material and/or water dispersible oxygen barrier material. WO 2013/076241 relates to a use of aqueous dispersion comprising polyvinyl acetate copolymers, and polymer having hydroxyl- and/or ionic groups for producing a barrier coating on film-like substrates. WO 2010/141581 on the other hand describes a method of coating sheet of paper or paperboard used as food packaging material, involving coating and drying a dispersion comprising mixture of anionic pigment and polyamine-epihalohydrin resin to sheet of paper or paperboard.

However, the prior art does not disclose mineral oil barrier coatings, which essentially decrease the harmful and toxic effect of mineral oil migration. Thus, there is a need for novel materials, which are preferably almost or entirely bio-based, providing a solution to the outstanding problem and tightening requirements by the relevant authorities.

SUMMARY OF THE INVENTION

The invention is defined by the features of the independent claims. Some specific embodiments are defined in the dependent claims.

According to a first aspect of the present invention, there is provided a renewable packaging material comprising a biopolymer-based mineral oil barrier layer against migration of mineral oil compounds.

According to a second aspect of the present invention, there is provided a method for producing a packaging material, wherein the rate of mineral oil migration is decreased to an acceptable level in packaging materials, which are facing the mineral oil containing environment.

These and other aspects, together with the advantages thereof over known solutions are achieved by the present invention, as hereinafter described and claimed.

The packaging material according to an embodiment of the present invention is mainly characterized by what is stated in the characterizing part of claim 1.

The method for producing a packaging material having desired properties against mineral oil migration is mainly characterized by what is stated in claim 9.

Considerable advantages are obtained by means of the invention. Recycled materials, such as paper and board, have recently raised concerns for potential migration of mineral oil hydrocarbons (MOH), which pose a potential safety risk e.g. for food packed in such materials. By using bio-based barrier coatings or films in inner pouches of cereals etc. dry food packaging, the mineral oil migration can be decreased down to acceptable level and not only the human health but also the environmental safety aspects will be addressed. The packaging materials provided herein, such as coatings and films, are able to effectively protect materials, such as dry-food, against the harmful effect of mineral oil migration. In addition, the materials of the present invention are completely bio-based and therefore intended for replacing current synthetic solutions and for example metallized films and aluminum foils.

Next, the present technology will be described more closely with reference to certain embodiments.

EMBODIMENTS

The present technology describes novel bio-based materials for decreasing the rate of mineral oil migration to an acceptable level in for example food packages and thus improving the safety of food, and other products facing the risk of mineral oil hydrocarbon migration.

A preferred embodiment of the present invention is a packaging material comprising a first layer and on said first layer a mineral oil barrier layer against migration of mineral oil compounds, having at least 85% decreased mineral oil migration rate compared to a material that comprises said first layer but does not comprise a mineral oil barrier layer.

According to one embodiment, the migration rate of mineral oil compounds is decreased at least 90%, and in particular at least 95%, when compared to a material that comprises said first layer but does not comprise a mineral oil barrier layer.

According to another embodiment of the present invention, the mineral oil barrier layer is 100% bio-based and the packaging material in total is at least 96% bio-based. In this context the term "bio-based" is intended to comprise raw materials that are originating from biomass.

According to a further embodiment of the present invention 100% bio-based mineral oil barrier coatings and films are applied onto bio-based HDPE-films, or onto paper and board. Preferably, the first layer consists of bio-HDPE.

Mineral oil compounds are typically based on linear and branched alkanes, alkyl-substituted cyclo-alkanes and aromatic hydrocarbons. Thus, the mineral oil barrier layer of the present invention is designed to decrease the rate of migration of such compounds.

According to one embodiment of the present invention the model compounds representing mineral oil compounds are intended to mean saturated or aromatic mineral oil hydrocarbons.

One embodiment of the present invention is a packaging material having at least two layers, wherein one of the layers is the first layer and consists of bio-HDPE (high-density polyethylene), of which at least one surface has been coated with a biopolymer-based mineral oil barrier layer, selected from the group consisting of: tempo-oxidized cellulose nanofibrils (Tempo-CNF), hydroxypropyl xylan (HPX), hydroxypropyl cellulose (HPC) and cross-linked polylactic acid (PLAX), or a mixture thereof.

One embodiment of the present invention is a packaging material comprising a bio-HDPE layer coated with a Tempo-CNF mineral oil barrier layer, wherein the thickness of the mineral oil barrier layer is between 1 to 2 µm and the packaging material has a mineral oil migration rate below 15 mg/kg against at least 13 carbon atoms containing mineral oil hydrocarbons.

Further embodiment of the present invention is a packaging material having a mineral oil migration rate below 2 mg/kg against at least 16 carbon atoms containing mineral oil hydrocarbons.

Also a method for producing a packaging material having a low rate of mineral oil migration belongs to the scope of the present invention. Such method includes at least the following steps:
  providing a bio-HDPE base material as a first layer,
  activating at least one surface of the first layer by physical surface activation treatment, preferably selected from corona or plasma treatment,
  providing a biopolymer-based mineral oil barrier material, selected from the group consisting of: tempo-oxidized cellulose nanofibrils (Tempo-CNF), hydroxypropyl xylan (HPX), hydroxypropyl cellulose (HPC) and cross-linked polylactic acid (PLAX) or a mixture thereof, as a second layer,
  applying the second layer on the activated surface of the base material to form a 2-layer structure, and
  forming a packaging material from the obtained 2-layer structure.

According to one embodiment of the present invention, the method comprises producing a packaging material having a rate of mineral oil migration below 15 mg/kg against at least 13 carbon atoms containing mineral oil hydrocarbons.

According to even further embodiment of the present invention, the method comprises producing a packaging material having a rate of mineral oil migration below 2 mg/kg against at least 16 carbon atoms containing mineral oil hydrocarbons.

Figure 1:
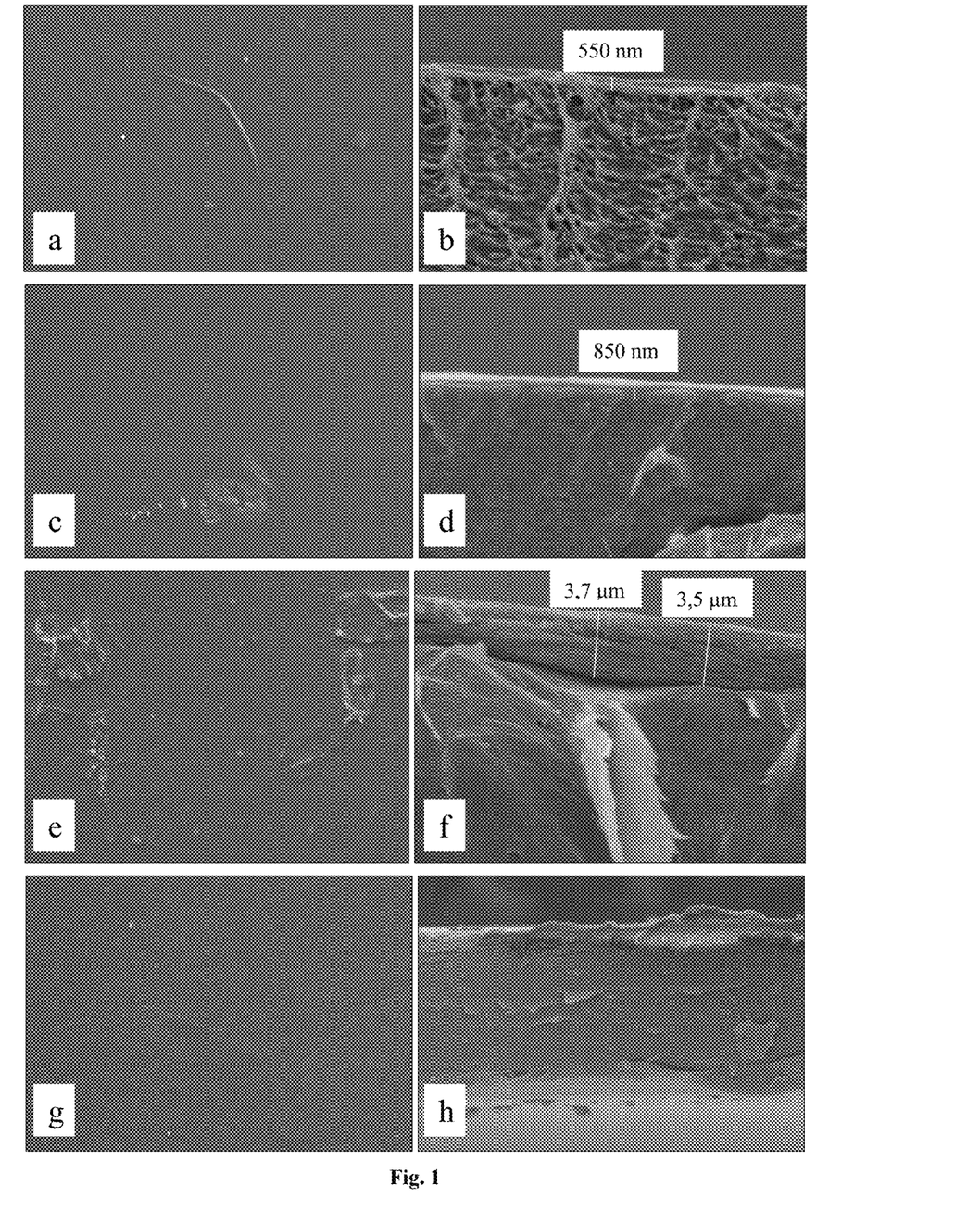
FIG. 1 shows SEM images of surface topography and cross-section of HPX (a, b), HPC (c, d) and Tempo-CNF (e, f) coatings on bio-HDPE film (g, h).

According to the present invention, HPX, HPC and Tempo-CNF coated bio-HDPE films were successfully produced. Each coating was homogenous and evenly distributed without any tendency towards layer separation. Sufficient bonding between coatings and the substrate is needed in order to minimize the delamination. The main mechanisms in adhesion include mechanical interlocking, diffusion, electron transfer, and adsorption. When close contact is formed at the interface, both primary and secondary chemical bonds can be formed. Sufficient wetting is required for good adhesion, whereas defects, such as air entrapment, can decrease the effective area participating in bonding. Physical surface activation treatments, such as corona or atmospheric plasma, were necessary for enhancing the wettability of surfaces and for increasing the interlayer bonding. As can be seen in FIG. 1, Tempo-CNF coatings were significantly thicker as compared to HPX and HPC. Viscosity of Tempo-CNF dispersion is considerably higher due to non-water-soluble hydrogel type structure. The higher viscosity enabled precise and trouble-free coating application in slot type feeding head. Aqueous solutions of HPX and HPC flowed easier, thus accurate wet layer thickness adjustment was problematic. Thickness of dry Tempo-CNF layer was near 4 µm, whereas other layers were <1 µm. Due to thinner structure of HPX and HPC coatings, the probability towards severe surface defects or even pinholes may have increased.

Figure 2:
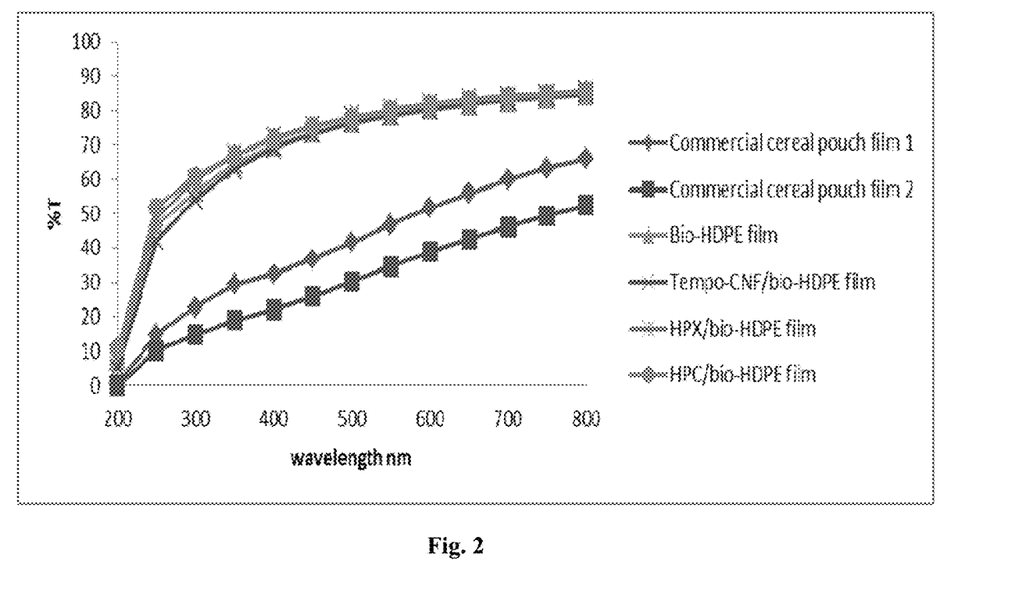
FIG. 2 is a graph showing the optical transmittance-% (% T) of the films as a function of wavelength.

All coated films were transparent and clear. The visual appearance of Tempo-CNF/bio-HDPE was excellent and HPX coated film was almost as good. HPC coating was slightly patchy and mat. Indeed, the high transparency was also confirmed by light absorption measurements. All coated bio-HDPE films had transmittance-% (% T) at 600 nm>80%, whereas both commercial cereal pouch films had % T<50% (FIG. 2).

Figure 3:
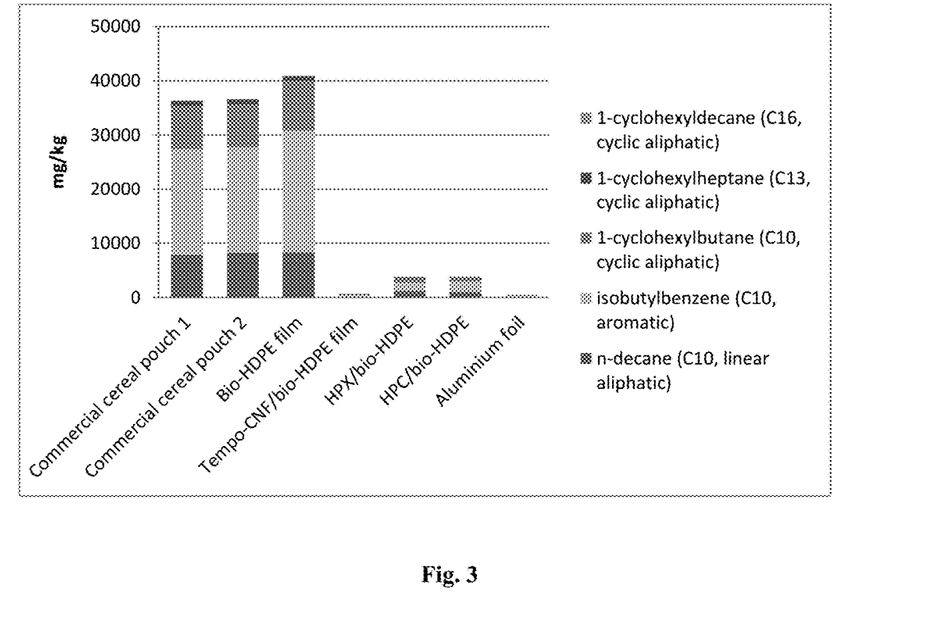
FIG. 3 is a graph showing mineral oil migration (mg/kg) through commercial cereal pouch films in comparison to bio-based barrier coated films according to the present invention.

As can be seen in FIG. 3, the mineral oil migration through non-coated bio-HDPE and both commercial cereal pouch films was significantly higher as compared to bio-based barrier coated films. N-decane, isobutylbenzene and 1-cyclohexylbutane (C10-components) constituted the major portion of the total migration. By using Tempo-CNF coating the amount of these components was reduced by 98%, 99%, 98%, respectively. Through HPX and HPC coatings the migration was slightly higher, but still about 90% reduction was obtained as compared to non-coated bio-HDPE film. Regarding the other components, 1-cyclohexylheptane (C13) and 1-cyclohexyldecane (C16), the barrier properties were slightly lower, but still convincing. Tempo-CNF coating decreased the migration by 97% and 87%, HPX coating by 88% and 67% and HPC coating by 91% and 77%, respectively. Based on the lab-scale coating trials, Tempo-CNF coating was qualified to further studies.

Figure 4:
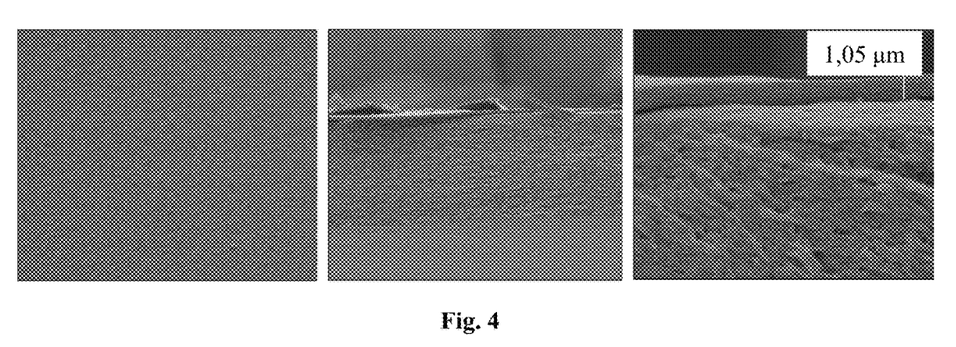
FIG. 4 shows SEM images of surface topography and cross-section of Tempo-CNF coatings on bio-HDPE film.

According to one embodiment of the present invention, Tempo-CNF coated bio-HDPE film was produced with SutCo semi-industrial roll-to-roll pilot-line. Spreading and adhesion between the substrate and aqueous CNF dispersions were carefully fixed with physical plasma-activation. Vetaphone Corona-Plus (Type TF-415, CP1C MKII 2.0 kW) equipped with argon/nitrogen plasma-unit was used for increasing the surface energy of bio-HDPE. Coating was applied using a specifically designed feeding head with a line speed of 1 m/min. In feeding head, the hydrogel formed an even and uniform wet layer which was finally dried in-line in 3 min under infrared heating. The resulting coatings had a dry thickness of 1-2 µm and a sufficient interlayer adhesion (FIG. 4). Bio-HDPE surface is rather nonpolar, whereas Tempo-CNF has carboxyl functional groups onto surface. The lack of polar components in polyethylenes limits their interactions with the polar materials, unless they were treated with plasma or corona, or otherwise oxidized.

Thus, according to one preferred embodiment the mineral oil barrier layer is adjusted to a thickness between 0.5 to 5 µm, preferably between 0.8 to 2 µm.

According to one embodiment of the present invention, a method for testing the mineral oil barriers of packaging materials was developed by the inventors as a response for the concerns of contamination of food by mineral oil compounds. The method is a modification of the so-called cup test using model compounds comparable to mineral oil components with different length and configuration of the hydrocarbon chain. The model compounds were introduced in the gas-phase as penetrants and the absorbed amounts were analysed from a food simulant (Tenax®). The method has been validated for coated and non-coated boards. Compared to folding box board without polymer coating, all samples with a polymer coating reduced the amount of C16 compound in Tenax® after 7 day tests at least by a factor of 3 to 12.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in areas relating to packaging industry. According to the Transparency Market Research, the global breakfast cereal market is expected to reach $43.2 billion by 2019. Breakfast cereals are typically packaged in paper and board packaging with or without inner pouches and consumed without further processing. Exposure to mineral oil residues from migration into breakfast cereals packaged in recycled paper and board without a barrier to migration may contribute significantly to the total dietary exposure, especially with small children. Thus, the present invention can for example be used for decreasing the effect of mineral oil migration in food, pharmaceutical or dietary supplement packaging and other relating applications. By using the bio-based barrier coatings according to the present invention for example in inner pouches of cereals etc. dry foods, the mineral oil migration can be decreased down to acceptable level and the health and safety of even the youngest consumers may be assured.

EXAMPLE 1

Suitable Materials and Methods

Tempo-CNF

CNF was obtained from UPM, Finland. The material contained approximately 2 wt % cellulose in water. Tempo-oxidized CNF was produced as follows: 0.1 mmol/g pulp (2,2,6,6-Tetramethylpiperidin-1-yl)oxy (Tempo) and 1 mmol/g pulp NaBr were dissolved in water. Solution was mixed with pulp in 1% consistency. Oxidation was initiated by adding 5 mmol/g pulp NaClO and adjusting pH to 10 with HCl. During oxidation, the pH was kept at 10 with NaOH. Oxidation was continued until pH of solution did not change, and reaction was quenched by adding ethanol. Oxidized pulp was then washed thoroughly with excess water and passed through a high-pressure homogenizer (M-110EH-30, Microfluidics Inc., USA) twice. The consistency was approximately 1 wt % and before coating it was further diluted to 0.5 wt %.

HPX

Hardwood xylan (HW-X) was extracted from industrial birch Kraft pulp using 1 M aqueous sodium hydroxide (NaOH) and recovered from the filtrate after extraction by ultrafiltration as reported earlier (Laine et al., 2013). The hydroxypropylated hardwood hemicellulose with DS 0.7 was prepared with 350 g xylan in 2600 mL NaOH and 3.5 equivalents of propylene oxide (Sigma Aldrich) at 50° C. for 2 hours in a pressurized 5 L Büchi reactor yielding 390 g of the product after ultra- and diafiltration and freeze-drying.

HPC

Hydroxypropylated cellulose was produced using the method presented earlier (Teng et al., 1978). Molar mass controlled cellulose was first mixed with 23 m-% aqueous NaOH (0.8 equivalents/cellulose AGU) and toluene and resulting mixture was stirred for 1 hour at room temperature in a pressure reactor. The propylene oxide (5 equivalents to cellulose AGU) was added under nitrogen atmosphere. The reactor was heated at 95° C. for 5 hours. After reaction the cellulose was cooled and solvent toluene was decanted. The hydroxypropyl cellulose was washed with ethanol, dissolved into water and then freeze-dried.

The freeze-dried products of HPX and HPC were mixed with 20% sorbitol (Sigma Aldrich) and dissolved into distilled water yielding 2% solution. Before coating all formulations were mixed first with Diaf dissolver for 1 h (500 rpm) and finally with SpeedMixer (DAC 110.1 VAC-p, Hauschild) for 2 min at 1500 rpm under vacuum to prevent formation of air bubbles.

Two commercial breakfast cereal boxes were purchased from the local supermarket. The inner pouch films were used as reference materials: Kellogg's Honey Cheerios (commercial cereal pouch film 1; 44 µm) and Myllarin Luomu Fruity Mysli (commercial cereal pouch film 2; 65 µm).

Bio-High-Density Polyethylene (Bio-HDPE)

Bio-based HDPE (Braskem SGE7252) film was produced using Extruder EX-35 (Extron Engineering) with a screw diameter (D) of 35 mm, a length-to-diameter ratio (L/D) of 30, and a cavity transfer mixer. A melt filter (50/325/50 mesh sieves) was used with a 300-mm-wide die (gap 0.7 mm). An air knife (90 kPa) and a nip roll (100 kPa) were used to enhance the contact between the film and the chill roll. Temperature profile within the extruder varied from 170 to 210° C. Temperature settings were as follows: 190° C. (melt filter and connector), 200° C. (die), and 80° C. (chill roll). Extruder throughput was 5.0 kg/h and line speed 8 m/min. Bio-HDPE film with a thickness of 48 mm was finally collected to a core. According to plastic manufacturer, the minimum biobased content (C14 content) of this material was 96%, determined according to ASTM D6866.

Lab-Scale HPX, HPC and Tempo-CNF Coating

Samples for preliminary tests were produced at lab-scale. First, bio-HDPE films were treated with LabTEC Tantec corona surface treatment for improving the wettability. The successful surface activation was confirmed by water contact angle measurements which indicated increased surface hydrophilicity. Due to corona activation, the contact angle dropped from 105° to 39°. Immediately after corona treatments, each coating formulation was applied onto bio-HDPE film by Erichsen Coatmaster 510 with line speed 1 m/min. The wet film deposits varying between 0.3 and 1.2 mm were used based on the consistency. The target dry thickness was 6 µm. Samples were dried at 85° C. for 15 min.

SEM

Scanning electron microscope (SEM; JEOL JSM-6360LV) with accelerating voltage control of 10-15 kV was used to visualize the topography and cross-section of the multilayer structures.

Optical Transmittance

UV-visible light absorption of the films between 200-800 nm was determined using Shimadzu UV-1800 UV-spectrophotometer. Absorbance (A) was converted into transmittance-% (% T) by using the following equation: $A=2-\log_{10}\% \text{ T}$.

Mineral Oil Migration 0.2 g of each surrogate compounds (n-decane, isobutylbenzene, 1-cyclohexylbutane, 1-cyclohexylheptane and 1-cyclohexyldecane) was added into a small Petri dish. Three of the filled Petri dishes were placed into the desiccator and kept there overnight. 1.26 g Tenax® was weighted into each test cup (68-3000 Vapometer EZ-Cups; Thwing-Albert Instrument Company) having mouth area of 32 cm$^2$. The materials tested for their barrier properties were fitted into the lid of the test cups, with the polyethylene layer facing the inside of the cup. Fluoropolymer sealings were used in the test cups. After the test period of 7 days at 23° C., the cups were removed from the closed space and the food simulant was extracted and the surrogate compounds quantified by gas chromatography. The similar procedure was followed when the heat-sealed pouches were tested. The pouches with total surface area of 32 cm$^2$ were filled with 1.26 g of Tenax® and closed by sealing.

Pilot-Scale Tempo-CNF Coating

Pilot-scale coating trials were carried out with SutCo semi-industrial roll-to-roll pilot-line at VTT. Vetaphone Corona-Plus (Type TF-415, CP1C MKII 2.0 kW) equipped with argon/nitrogen plasma-unit was used for increasing the surface energy of bio-HDPE film. Coatings were applied using a specifically designed feeding head with a line speed of 1 m/min and dried in-line under Krelus (Krelus AB, Switzerland) and Ircon (Ircon Drying Systems AB, Sweden) infrared heating systems.

Oxygen Transmission

Oxygen transmission rates (OTR) were determined according to standard ASTM D3985 using Ox-Tran 2/21 Oxygen Transmission Rate System (Mocon, Modern Controls Inc., USA). The tests were carried out at 23° C. temperature and 0, 50, and 80% relative humidities using samples with a test area of 50 cm$^2$.

Water Vapor Transmission

Water vapor transmission rates (WVTR) of the films were determined according to standard ASTM F-1249 using Permatran-W 3/33 MG Plus (Mocon, Modern Controls Inc., USA). The tests were carried out at 23 and 38° C. temperatures and 90% relative humidity using samples with a test area of 50 cm$^2$.

Grease Penetration

Grease penetration was determined according to modified Tappi T 507 method. First, standard olive oil was colored with Sudan II dye and applied onto 5 cm×5 cm sized blotting paper. Stain saturated piece of blotting paper was placed against the films and a piece of blank blotting paper (stain absorber) was placed against the other side. The whole stack was pressed between two plates and kept in oven at 40° C.

for 7 days. At the end of the test period, the assembly was removed and the stain absorbers were examined. For each absorber the area and the number of stained spots, if any, were determined.

Repellency to Grease and Oil (KIT Test)

Surface repellency was determined according to modified Tappi T 559 method. Castor oil, toluene and n-heptane or mixtures of them in different concentrations were put in contact with coated films and examinated visually. A failure was denoted by a wetting or darkening of the surface due to penetration of the test solution.

Heat Sealability

Heat sealability of the films was determined using the sealing strength tester (Labormaster HTC 3000, Willi Kopp, Germany). The sealing strength was measured after sealing at 125° C. with a sealing force of 900 kPa, a sealing time of 0.7 s, a delay time of 10 s, and a peeling rate of 12 m/min. Width of the sample strips was 2 cm. In each case, the bio-HDPE surfaces were sealed against each other.

EXAMPLE 2

Results Relating to OTR, WVTR and Mineral Oil Migration

Polyethylenes are thermoplastic polymers consisting of long nonpolar hydrocarbon chains. The solubility of nonpolar oxygen molecules in polyethylene is proportional to the volume of the amorphous phase (Michaels et al., 1961). Oxygen transmission of bio-HDPE film was similar to petroleum-based polyethylenes, i.e., relatively high (2800 cc/m$^2$/day) and independent on the relative humidity (Table 1). Oxygen barrier properties of semicrystalline polymers are mainly due to the crystalline regions which are considered to be gas impermeable. CNF coatings have low oxygen permeability due to relatively high crystallinity and the ability to form a dense network via cellulose nanofibrils (Aulin et al., 2009; Hayaka et al., 2009; Aulin et al., 2010; Syverud and Stenius, 2009). Close packing of fibrils reduces the free volume and efficiently prevents the oxygen transmission. High surface area and polarity of nano-sized fibrils result in enhanced fibril-to-fibril attraction especially at low humidity. Indeed, Tempo-CNF coated bio-HDPE films had very low oxygen transmission rate 0.5 cc/m$^2$/day at dry test condition. Due to the hydrogen bonds, the movement of fibrils was restricted efficiently preventing the oxygen permeation. Typically the barrier properties of most bio-based films are very sensitive to moisture variations. Water molecules enter the polymer and break the hydrogen bonds that keep the chains together. At high humidity conditions, the CNF coating tend to swell, which resulted in considerably higher oxygen transmission rate at high humidity (Vartiainen et al., 2015).

TABLE 1

Oxygen Transmission Rates of Multilayer Films at 23° C. and 0, 50, and 80% Relative Humidity Expressed as cc/m$^2$/day.

|  | 0% RH | 50% RH | 80% RH |
| --- | --- | --- | --- |
| Commercial cereal pouch film 1 | 1022 | 1040 | 1081 |
| Commercial cereal pouch film 2 | 789 | 781 | 788 |
| Bio-HDPE film | 2770 | 2700 | 2890 |
| Tempo-CNF/bio-HDPE film | 0.5 | 8 | 685 |

Polyolefins are currently the most widely used moisture barrier plastic. HDPE's inherently good water vapor barrier properties were only slightly improved by using the additional barrier layer. Temperature had a more distinctive effect on the water vapor transmission rates (Table 2).

TABLE 2

Water vapor transmission rates of multilayer films at 23 and 38° C., 90% relative humidity expressed as g/m$^2$/day.

|  | 23° C., 90% RH | 38° C., 90% RH |
| --- | --- | --- |
| Commercial cereal pouch film 1 | 0.5 | 1.4 |
| Commercial cereal pouch film 2 | 0.4 | 1.1 |
| Bio-HDPE film | 0.8 | 2.2 |
| Tempo-CNF/bio-HDPE film | 0.7 | 2.0 |

Tempo-CNF coated bio-HDPE film was completely impermeable to grease (olive oil) under the test conditions. Impermeability to grease is a typical and well-known feature of all biopolymer films. In cellulose-based films, high surface hydrophilicity and a great number of polar hydrogen bonds enable excellent barrier properties against all nonpolar permeants. No visual failure was denoted in surface repellency test, thus Tempo-coating was also totally intact in contact with castor oil, toluene and n-heptane or mixtures of them (KIT-value 12). Grease impermeability also indicated the absence of defects, cracks and holes in the films.

Tempo-CNF coated bio-HDPE film was easily heat-sealed at 125° C. Seal strengths were >150 N/m when bio-HDPE surfaces were sealed against each other, and the measurements were carried out after 10 s delay time. The results confirmed that the adhesive strength of the seal was higher than the cohesive strength of the film indicating production of an ideal seal. The further mineral oil migration tests were conducted with heat-sealed pouches made out of Tempo-CNF coated bio-HDPE film. Small pouches with dimensions of 4 cm×4 cm were filled with Tenax and closed by sealing.

Barrier bags prepared from Tempo-CNF coated bio-HDPE film protected the content to a great extent from mineral oil migration. There was no evidence of any leakages through heat-sealed areas and films behaved faultlessly during processing. Very low migration of each mineral oil component was obtained with Tempo-CNF coatings. Migration after 7 days at 23° C. for n-decane, isobutylbenzene, 1-cyclohexylbutane, 1-cyclohexylheptane and 1-cyclohexyldecane was 207, 173, 125, 13 and 1 mg/kg respectively. Significant improvement was attained as compared to non-coated bio-HDPE and commercial cereal pouch films (Table 3).

TABLE 3

Migration of mineral oil model compounds (mg/kg).

|  | n-decane | isobutylbenzene | 1-cyclohexyl butane | 1-cyclohexyl heptane | 1-cyclohexyl decane |
|---|---|---|---|---|---|
| Commercial cereal pouch film 1 | 7960 | 19462 | 7974 | 893 | 5 |
| Commercial cereal pouch film 2 | 8289 | 19473 | 7909 | 897 | 6 |
| bio-HDPE pouch* | 14713 | 40209 | 15188 | 2331 | 45 |
| Tempo-CNF/bio-HDPE pouch* | 207 | 173 | 125 | 13 | 1 |

*heat sealed pouch filed with Tenax ®

CITATION LIST

Patent Literature

1. US 2006/0286367
2. WO 2013/076241
3. WO 2010/141581

Non Patent Literature

1. The Future of Global Packaging to 2018, Smithers Pira Market Report, http://www.smitherspira.com/products/market-reports/packaging/global-world-packaging-industry-market-report.
2. Vartiainen, Jari; Vaha-Nissi, Mika; Harlin, Ali. 2014. Biopolymer Films and Coatings in Packaging Applications: A Review of Recent Developments. Materials Sciences and Applications. Scientific Research An Academic Publisher, vol. 5, 10, ss. 708-718.
3. Panel on Contaminants in the Food Chain (CONTAM), Scientific Opinion on Mineral Oil Hydrocarbons in Food. *EFSA Journal* 2012; 10 (6): 2704.
4. Matissek, R. Food-Lab Int. 2014, 1, 6.
5. K. Fiselier and K. Grob, Barriers against the Migration of Mineral Oil from Paperboard Food Packaging: Experimental Determination of Breakthrough Periods," Packag. Technol. Sci., vol. 25, pp. 285-301, 2012.
6. J Ewender, R. Franz, and F. Welle, Permeation of Mineral Oil Components from Cardboard Packaging Materials through Polymer Films, Packag. Technol. Sci., vol. 26, pp. 423-434, 2013.
7. Laine, Christiane; Harlin, Ali; Hartman, Jonas; Hyvarinen, Sari; Kammiovirta, Kari; Krogerus, Björn; Pajari, Heikki; Rautkoski, Hille; Setälä, Harri; Sievänen, Jenni; Uotila, Johanna; Vähä-Nissi, Mika. 2013. Hydroxyalkylated xylans: Their synthesis and application in coatings for packaging and paper. Industrial Crops and Products. Elsevier, vol. 44, ss. 692-704.
8. Teng J, Dai F, Stubits M, US4.096.325/1978.
9. Vartiainen, Jari; Shen, Yingfeng; Kaljunen, Timo; Malm, Tero; Vähä-Nissi, Mika; Putkonen, Matti; Harlin, Ali. 2015. Bio-based multilayer barrier films by extrusion, dispersion coating and atomic layer deposition. Journal of Applied Polymer Science. Wiley, vol. 133, 2, ss. Article number 42260.
10. Michaels, A.; Bixler, H. J. Polym. Sci. A 1961, 50, 413.
11. Aulin, C.; Ahola, S.; Josefsson, P.; Nishino, T.; Hirose, Y.; Österberg, M.; Wågberg, L. Langmuir 2009, 25, 7675.
12. Hayaka, F.; Saito, T.; Iwata, T.; Kumamoto, Y.; Isogai, A. Biomacromolecules, 2009, 10, 162.
13. Aulin, C.; Gallstedt, M.; Lindstrom, T. Cellulose 2010, 17, 559.
14. Syverud, K.; Stenius, P. Cellulose 2009, 16, 75.
15. Breakfast Cereals Market—Global Industry Analysis, Size, Share, Growth, Trends and Forecast, 2013-2019, Transparency Market Research, http://www.transparencymarketresearch.com/pressrelease/breakfast-cereals-industry.htm

The invention claimed is:

1. A packaging material comprising at least two layers, wherein a first layer comprises an activated bio-HDPE (high-density polyethylene) layer having at least one surface has been coated with a Tempo-CNF biopolymer-based mineral oil barrier layer comprising Tempo (2,2,6,6-tetramethylpiperidin-1-yl)oxy)-oxidized cellulose nanofibrils (Tempo-CNF),
wherein the Tempo-CNF biopolymer-based mineral oil barrier layer is coated directly on the activated bio-HDPE layer, and
wherein the packaging material has at least an 85% smaller mineral oil migration rate compared to a packaging material that comprises said first layer but does not comprise the Tempo-CNF biopolymer-based mineral oil barrier layer.

2. The packaging material according to claim 1, the Tempo-CNF biopolymer-based mineral oil barrier layer is a barrier to saturated or aromatic mineral oil hydrocarbons.

3. The packaging material according to claim 1, wherein the Tempo-CNF biopolymer-based mineral oil barrier layer is 100% bio-based, and the packaging material in total is at least 96% bio-based.

4. The packaging material according to claim 1, wherein the Tempo-CNF biopolymer-based mineral oil barrier layer has a thickness between 0.5 to 5 µm.

5. The packaging material according to claim 1, wherein the first layer consists of bio-HDPE (high-density polyethylene).

6. The packaging material according to claim 1, wherein the mineral oil migration rate is below 2 mg per kg of food against at least 16 carbon atom-containing mineral oil hydrocarbons.

7. The packaging material according to claim 1, wherein the Tempo-CNF biopolymer-based mineral oil barrier layer has a thickness between 0.8 to 2 µm.

8. The packaging material according to claim 1, wherein a thickness of the Tempo-CNF biopolymer-based mineral oil barrier layer is between 1 to 2 µm, and wherein the mineral oil migration rate of the packaging material is below 15 mg per kg of food against at least 13 carbon atom-containing mineral oil hydrocarbons.

9. The packaging material according to claim 1, wherein the at least two layers consists of the activated bio-HDPE layer and the Tempo-CNF biopolymer-based mineral oil barrier layer.

10. The packaging material according to claim 1, wherein the packaging material is heat sealable to itself.

11. The packaging material according to claim 1, wherein the packaging material comprises at least a 98% barrier against migration of 1-cyclohexylbutane, isobutylbenzene, and n-decane.

12. The packaging material according to claim 1, wherein the packaging material comprises at least a 98% smaller mineral oil migration rate compared to a packaging material that comprises said first layer but does not comprise the Tempo-CNF biopolymer-based mineral oil barrier layer.

13. A method for producing a packaging material having a low rate of mineral oil migration comprising the steps of:
 providing a bio-HDPE base material as a first layer,
 activating at least one surface of the first layer by physical surface activation treatment, selected from corona or plasma treatment,
 providing a Tempo-CNF biopolymer-based mineral oil barrier material comprising Tempo (2,2,6,6-tetramethylpiperidin-1-yl)oxy)-oxidized cellulose nanofibrils (Tempo-CNF) as a second layer,
 applying the second layer directly on the activated surface of the first layer to form a 2-layer structure, wherein the packaging material has at least an 85% smaller mineral oil migration rate compared to a packaging material that comprises said first layer but does not comprise the Tempo-CNF biopolymer-based mineral oil barrier layer, and
 forming the packaging material from the obtained 2-layer structure.

14. The method according to claim 13, wherein the second layer consists of Tempo-CNF, which thickness is adjusted to 1-2 µm.

15. The method according to claim 13, wherein the packaging material has a rate of mineral oil migration below 15 mg/kg against at least 13 carbon atom-containing mineral oil hydrocarbons.

16. The method according to claim 13, wherein the packaging material has a rate of mineral oil migration below 2 mg per kg of food against at least 16 carbon atom-containing mineral oil hydrocarbons.

* * * * *